United States Patent [19]

Reznikov et al.

[11] Patent Number: 5,016,946

[45] Date of Patent: May 21, 1991

[54] MODULAR STORAGE CONTAINER FOR DISKETTES

[75] Inventors: Naum Reznikov, San Francisco; Marc T. Protiva, San Jose, both of Calif.

[73] Assignee: Innovative Concepts, Inc., San Jose, Calif.

[21] Appl. No.: 489,404

[22] Filed: Mar. 5, 1990

[51] Int. Cl.⁵ .......................................... A47B 87/00
[52] U.S. Cl. ................................. 312/108; 312/330.1
[58] Field of Search ..................... 312/107, 108, 344.1, 312/330; 220/4 E

[56] References Cited

U.S. PATENT DOCUMENTS

| | | | |
|---|---|---|---|
| 3,203,744 | 8/1965 | Batke et al. | 312/108 X |
| 3,396,867 | 8/1968 | Garriga | 220/4 E |
| 3,606,506 | 9/1971 | Ungaro | 312/107 X |
| 3,908,852 | 9/1975 | Ricobene et al. | 220/4 E |
| 4,216,763 | 8/1980 | Miklas | 220/4 E |

Primary Examiner—Joseph Falk
Attorney, Agent, or Firm—Rosenblum, Parish & Bacigalupi

[57] ABSTRACT

A modular storage container including a drawer configured to be received into and contained by a housing. The housing consists of two identical molded units that are joined and fastened together by a guide bracket. The guide bracket also functions to position the drawer within the housing. The drawer slides within the housing on a drawer glide which interfaces with the guide bracket of the housing. Two sets of ridges are disposed on outer surface of the base of each molded unit. When two or more containers are stacked, the ridges on the top of the supporting container will interdigitate with the ridges on the underside of the mounted container to align the containers squarely atop each other and to inhibit longitudinal and lateral movement of the stacked containers. Each container has a drawer lock for security.

10 Claims, 17 Drawing Sheets

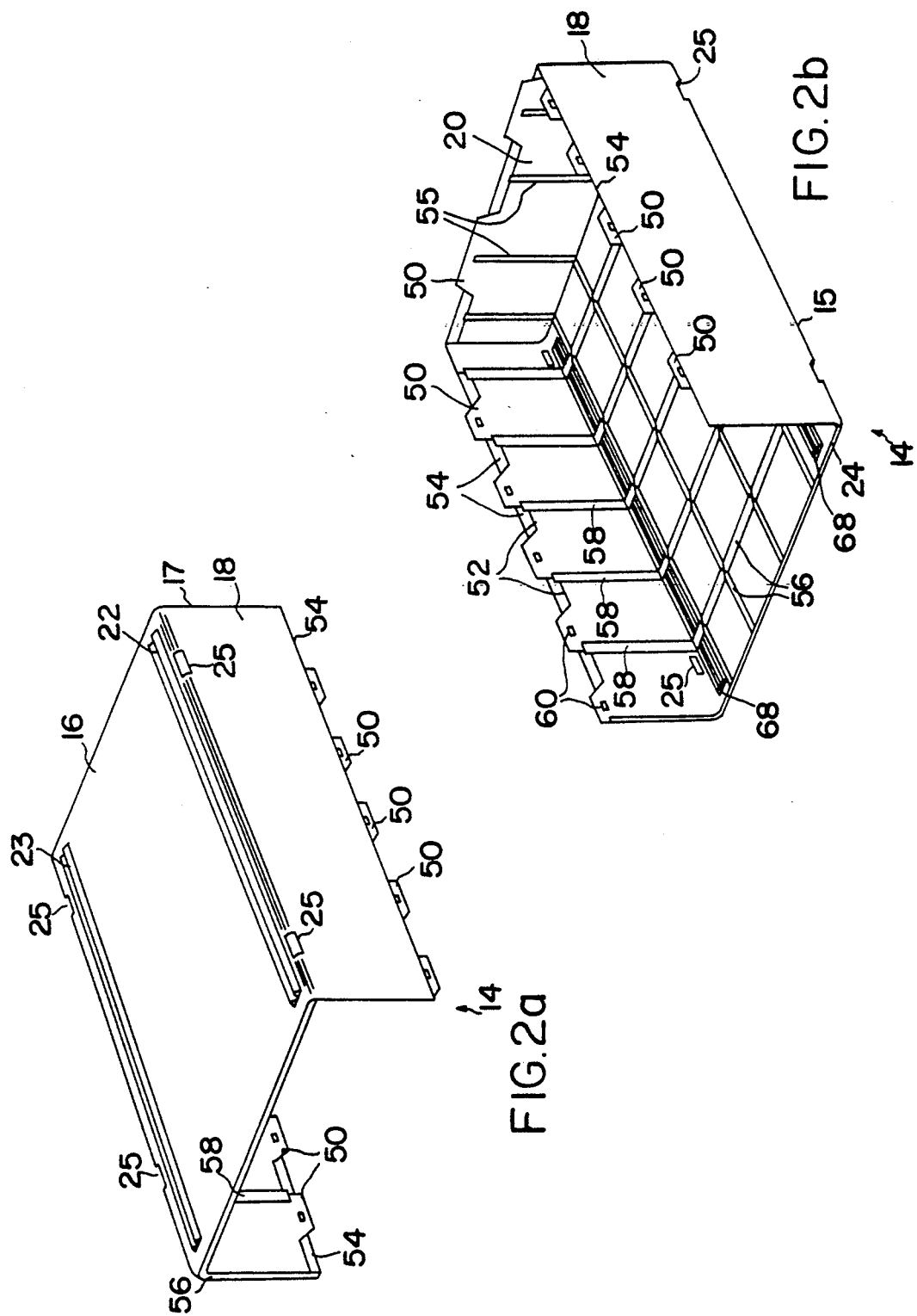

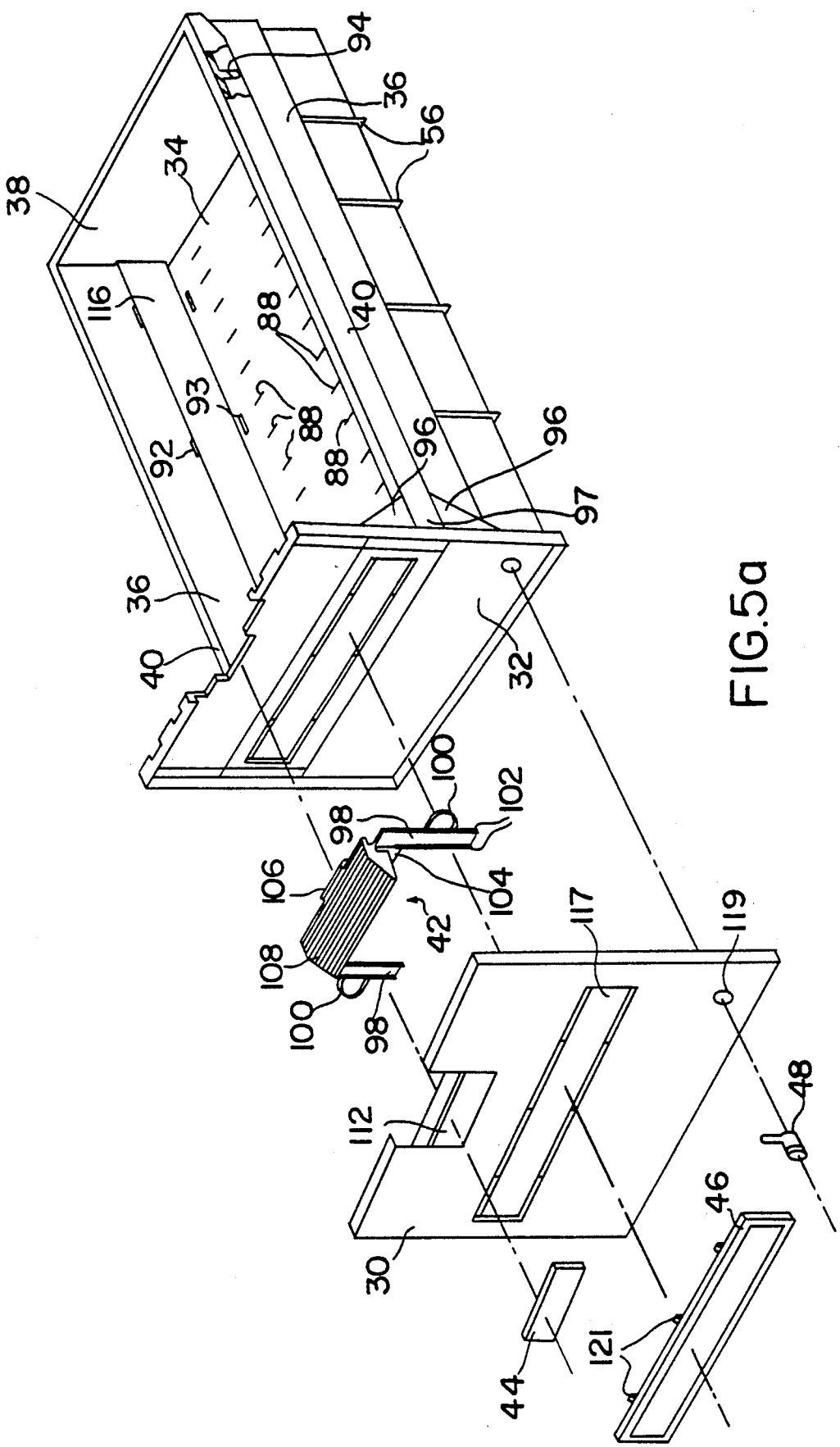

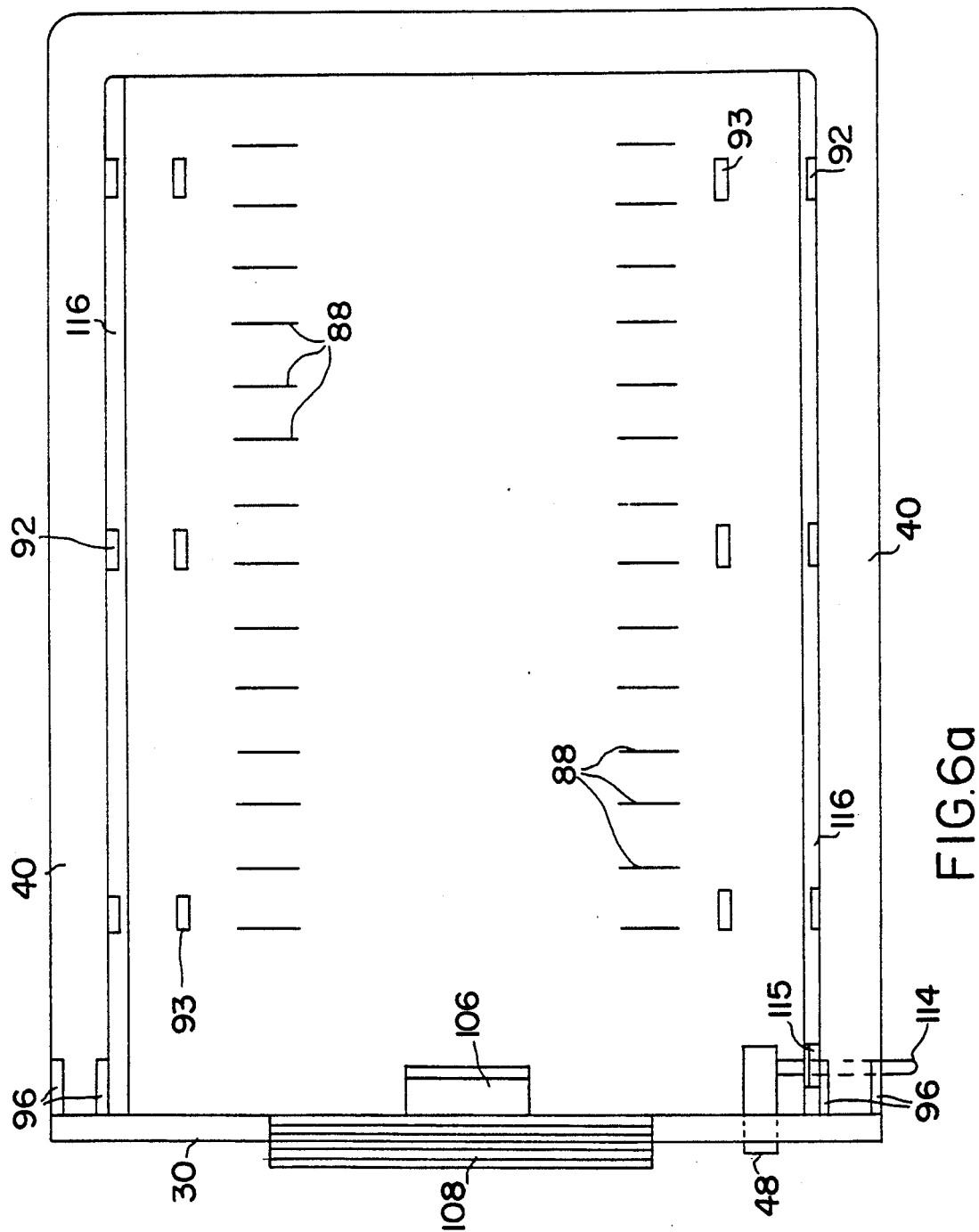

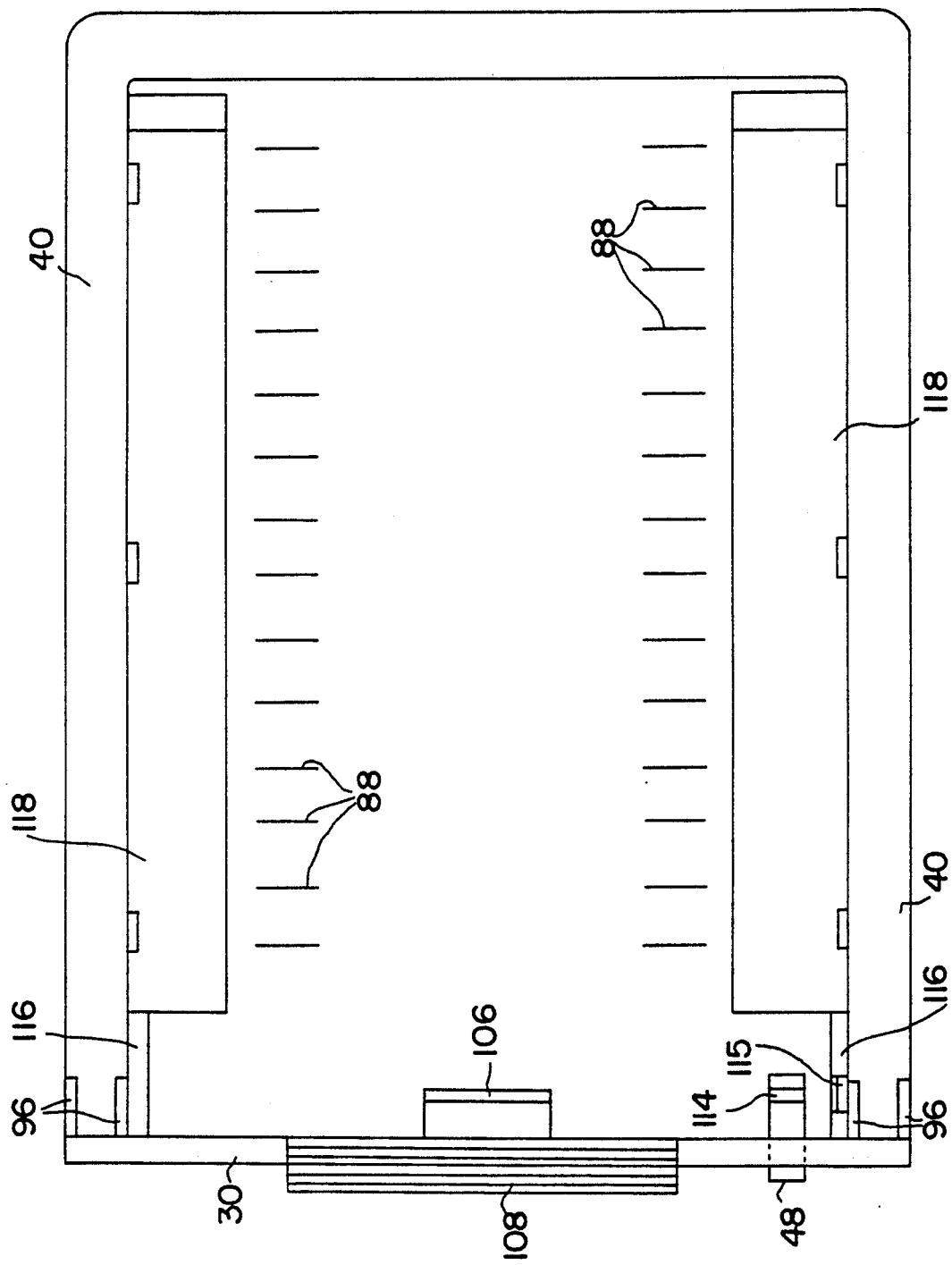

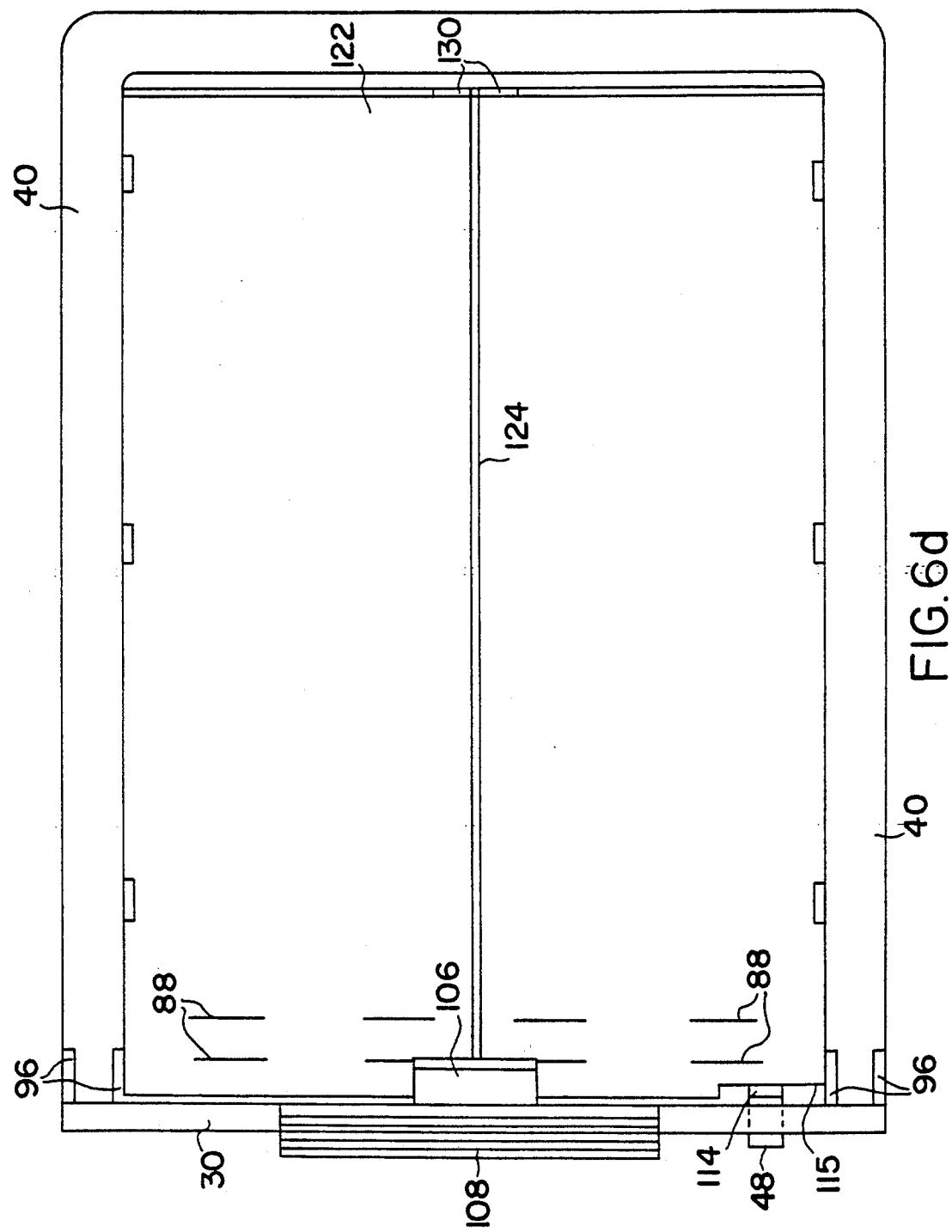

MODULAR STORAGE CONTAINER FOR DISKETTES

BACKGROUND OF THE INVENTION

1. Field of the Invention

The present invention relates generally to storage containers for floppy disks or diskettes, and more particularly to such containers designed specifically for use as modular containers which have the capability of being stacked or aligned in such a way as to create a compact, space-efficient network of storage compartments.

2. Brief Description of the Prior Art

Floppy disks or diskettes (simply 'diskettes' hereinafter) are mainly used in conjunction with computers or word processors. Therefore, the diskettes are generally kept in close proximity to a computer or word processor, many times sharing a limited amount of table-top or desk-top space with the computer or word processor. Numerous configurations of diskette storage containers are provided in the prior art. The Media Box by Posso, a French company, utilizes a handle-less drawer with a drawer glide at its base, contained by a one-piece housing having two ridges at the top of the housing and a network of channels underneath the housing. The Media Box units can be stacked, whereby the ridges atop the base unit are inserted into the chosen channel(s) on the underneath of the upper unit, and both units are secured by a separate clasp. Due to the choice of channels, the stacked units do not have to be centered atop one another. Instead of adapting one box to accommodate different sizes of contents, the Media Box itself is offered in various sizes.

Another prior art diskette container configuration consists of a molded base portion with a pivotally interconnected cover portion whose interior space contains the diskettes and dividers for separating groups of diskettes. In a similar configuration, the cover portion can be pivoted in such a way that it becomes a stand, upholding the diskette-containing base portion. Another configuration includes a support member for allowing the diskettes and dividers to lay in a forward inclined position. The support member is required in this configuration because the base portion does not include a front wall. Instead, the front wall is an element of the cover portion and therefore when the cover is in the open position, there is no wall or bar to limit the forward motion of the diskettes.

Many problems with the prior art configurations stem from the design of the access to the diskettes. In these configurations, an area of clearance is required above and sometimes behind the container in order to open the cover portion. Thus, they are not stackable. Additionally, the use of a plurality of containers requires an impractical amount of table- or desk-top space.

Other shortcomings in the design of the prior art lay in the area of operator interface This is to say that some containers require that the operator use two hands to open and/or close the container. It is generally desirable to maintain a diskette container in a closed position, except in times of diskette retrieval or restorage by the operator, in order to reduce the risk of damage to, or contamination of, the diskettes, and also to reduce their exposure to dust. If an operator finds it cumbersome to repeatedly open or close a diskette container, he will most likely leave the container open, thereby defeating the diskette safety feature of the container.

SUMMARY OF THE INVENTION

It is a primary object of this invention to provide a storage container that can be used by itself or as a modular unit in conjunction with one or more other containers of the same manufacture.

It is an object of this invention to provide a storage container which may be fixedly stacked atop other containers of the same manufacture.

It is another object of this invention to provide a storage container which may be aligned immediately adjacent to other containers of the same manufacture.

It is yet another object of this invention to provide a storage container having easily operable opening means for accessing the contents thereof.

Another object of this invention is to provide a storage container having easily operable closing means for securely covering the contents thereof.

It is also an object of this invention to provide a storage container for diskettes which is adaptable to contain either one row of standard diskettes or twin rows of mini diskettes.

A further object of this invention is to provide a storage container whose housing consists of two identical molded units joined together and fastened by a guide bracket.

The container of this invention comprises two identical molded units, each unit having a flat base joined to two side walls and one rear wall, wherein said two molded units are mated to form a generally box-like housing A guide bracket is disposed along the inner periphery of the housing side walls, at the joint of the two molded units and functions to fasten the upper and lower units of the housing together. A separate drawer unit is comprised of a flat base joined to two side walls and one rear wall, each of said side walls and rear wall being approximately equal in height to said side and rear walls of one of said molded units. The drawer also includes a front panel equal in size to the front opening of said housing and a drawer glide that is disposed along the top edge of each of the two drawer side walls. The drawer is received and contained within the housing, sliding therewithin on the drawer glide supported by the guide bracket. The front panel houses a handle, label window, drawer latch and keyed lock.

An advantage of the present invention is that it provides two identical units which are used to create the housing, making the container easier to manufacture and reducing the amount of wasted space when the containers are packaged for shipping.

Another advantage of the present invention is that by using two identical units to create the housing, the ridges on the top of one unit will interdigitate with the ridges on the base of the stacked unit, thereby aligning and securing the two units together.

A further advantage of the present invention is that it provides a dual functioning guide bracket which positions the drawer within the housing and also fastens together the two molded units of the housing.

Another advantage of the present invention is that inserts are used to adapt the size of the drawer to accommodate its contents, thereby allowing for one size of container to efficiently house various types of contents.

It is an advantage of the present invention that it provides both a latch and a recessed handle thereby allowing for one-handed opening and closing of the storage container.

Another advantage of the present invention is that it provides a keyed lock for security.

These and other objects and advantages of the present invention will no doubt become apparent to those skilled in the art after having read the following detailed description of the preferred embodiment which is contained in and illustrated by the various drawing figures.

IN THE DRAWING

FIG. 1a a perspective view of a modular storage container for diskettes in accordance with the present invention, shown in a partially open configuration.

FIG. 2a illustrates a molded unit of the present invention in a perspective view.

FIG. 2b also illustrates a molded unit in a different perspective view, and shows how the unit of FIG. 2a would mate with the unit of FIG. 2b to form a housing unit.

Figure 3A:
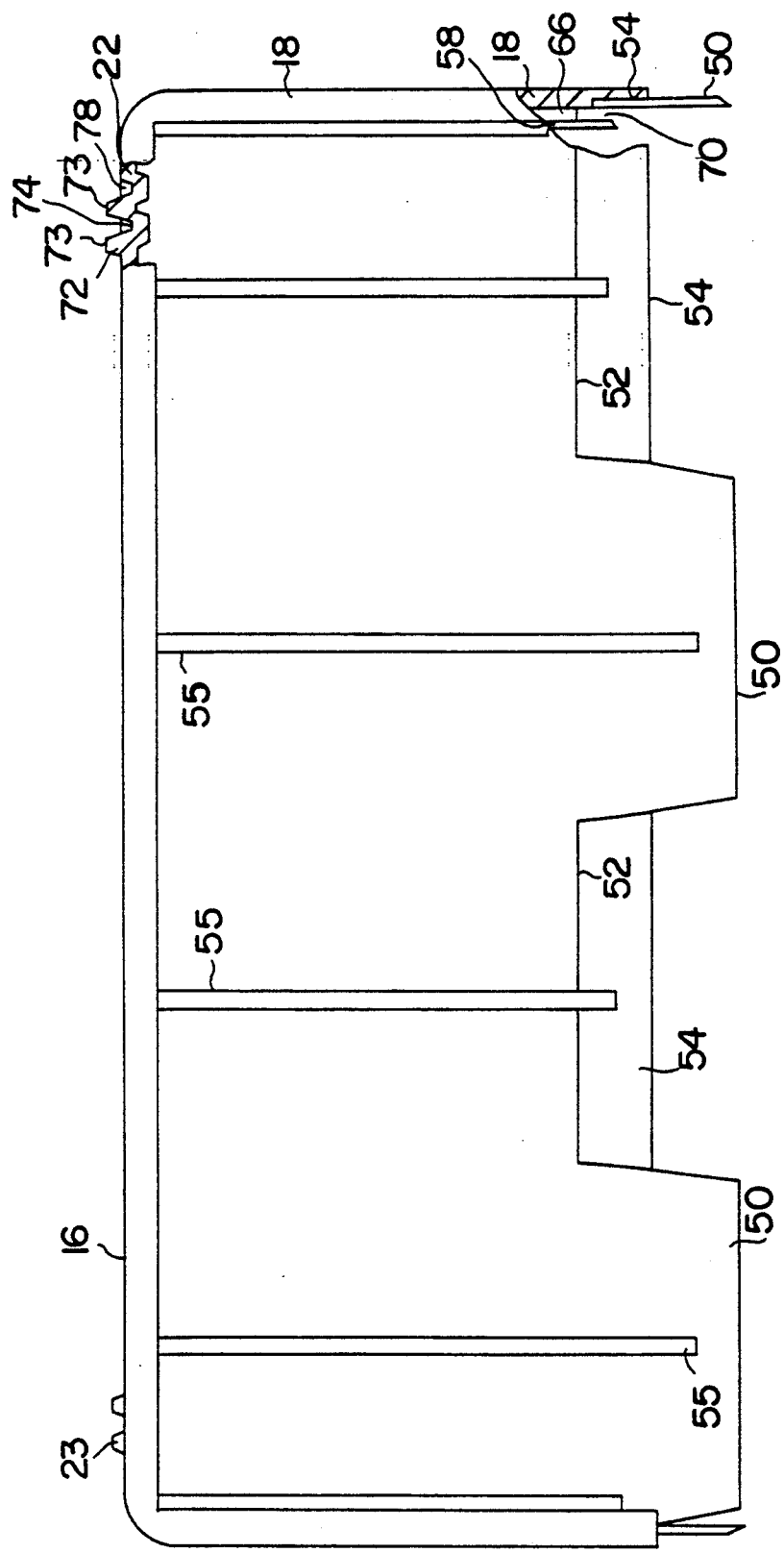

FIG. 3a is a front view of a molded unit further illustrating the ridge structure of the base, and the tab and skirt structure of the side walls.

Figure 3B:
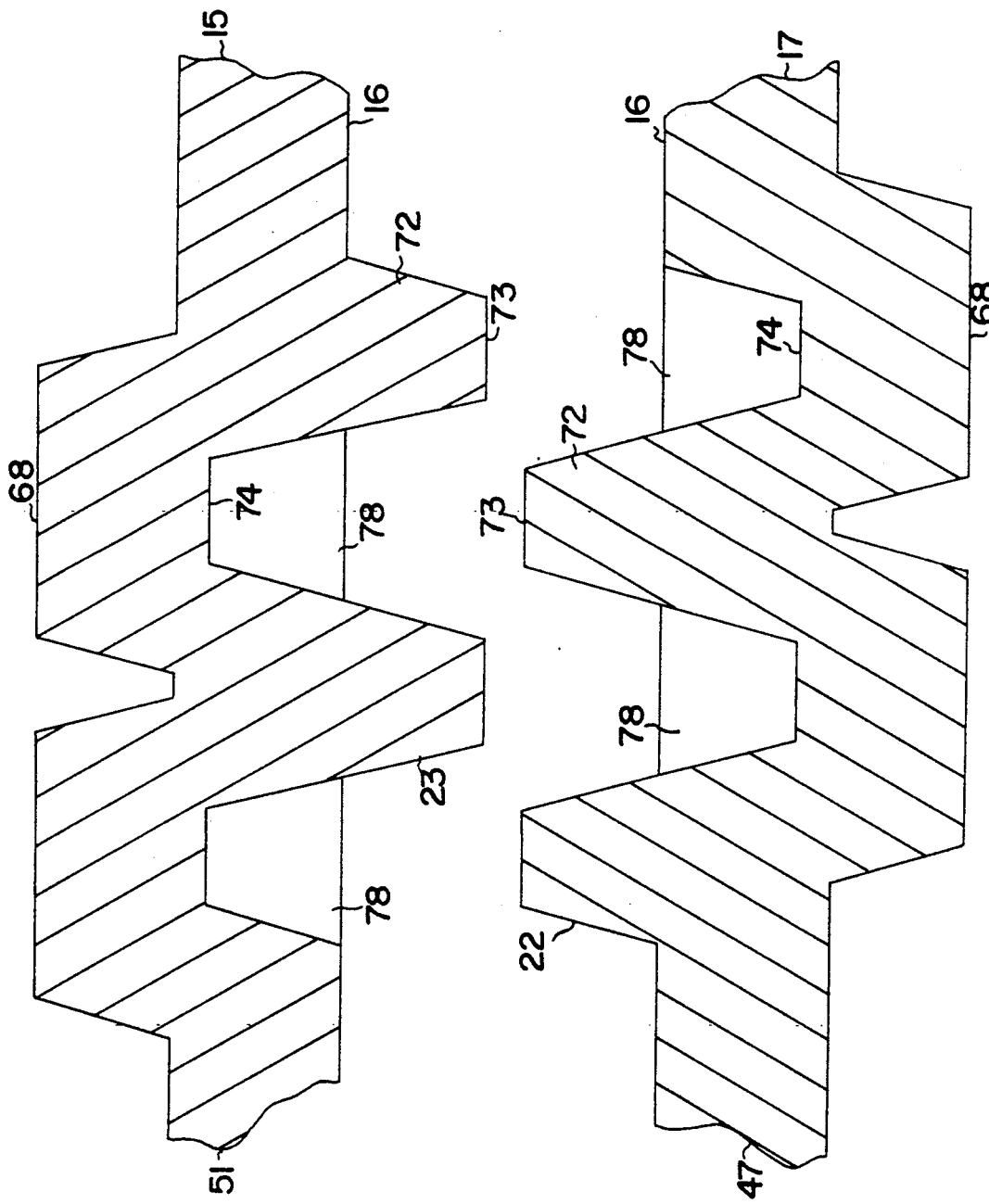

FIG. 3b is a detail of the ridges shown in FIG. 3a also showing how the ridges interdigitate when one unit of the preferred embodiment is stacked atop another.

Figure 3C:
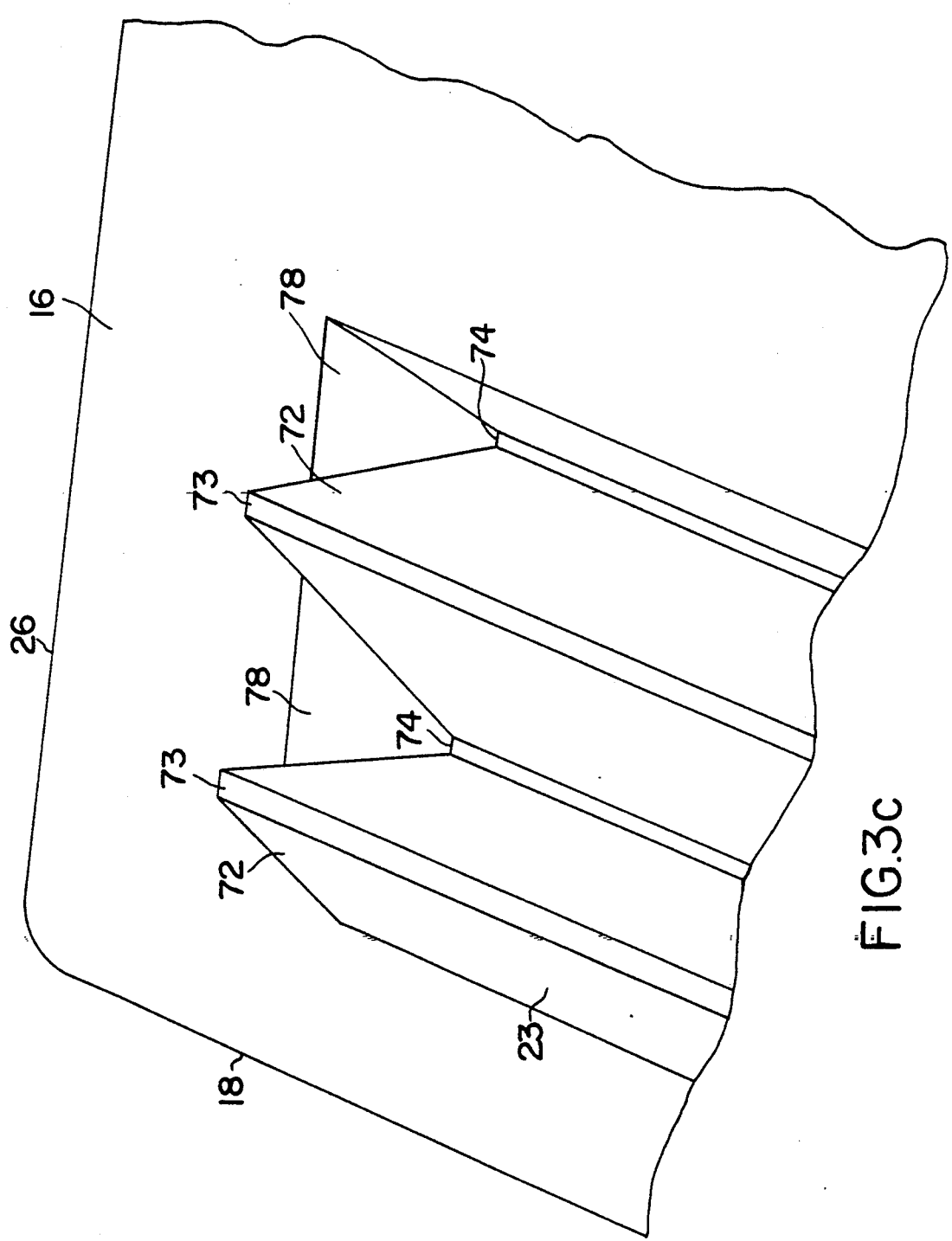

FIG. 3c is a perspective view of a portion of the ridges on the outside of the base showing the stop which prohibits forward and backward movement of a stacked unit.

Figure 4A:
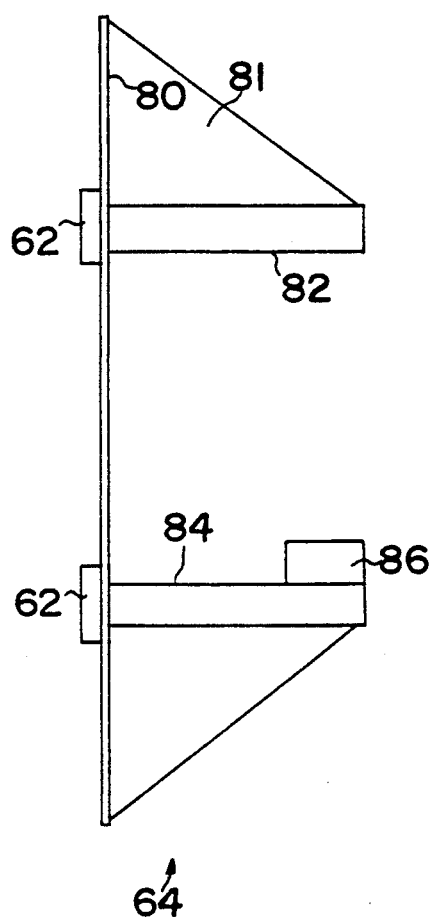

FIG. 4a is a side view of a guide bracket showing the restraints on the back side of the bracket.

Figure 4B:
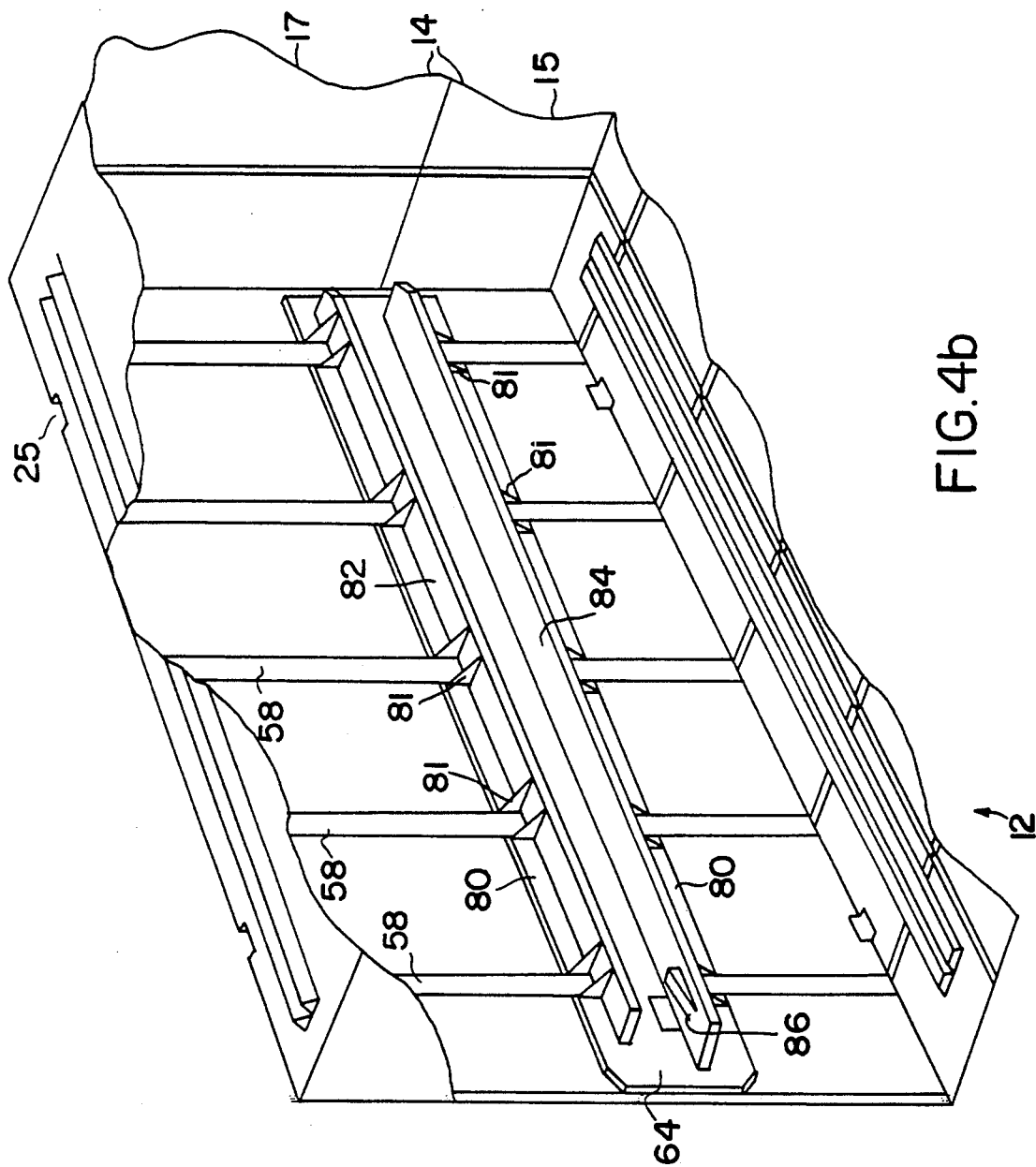

FIG. 4b is a perspective view of a housing of the preferred embodiment, broken away to show the installation and positioning of the guide bracket within the housing.

FIG. 5a is an exploded perspective view of a drawer unit showing the assembly of the front panel elements, the latch assembly and the face plate, in addition to the drawer stop plate shown by the broken section of the drawer glide.

Figure 5B:
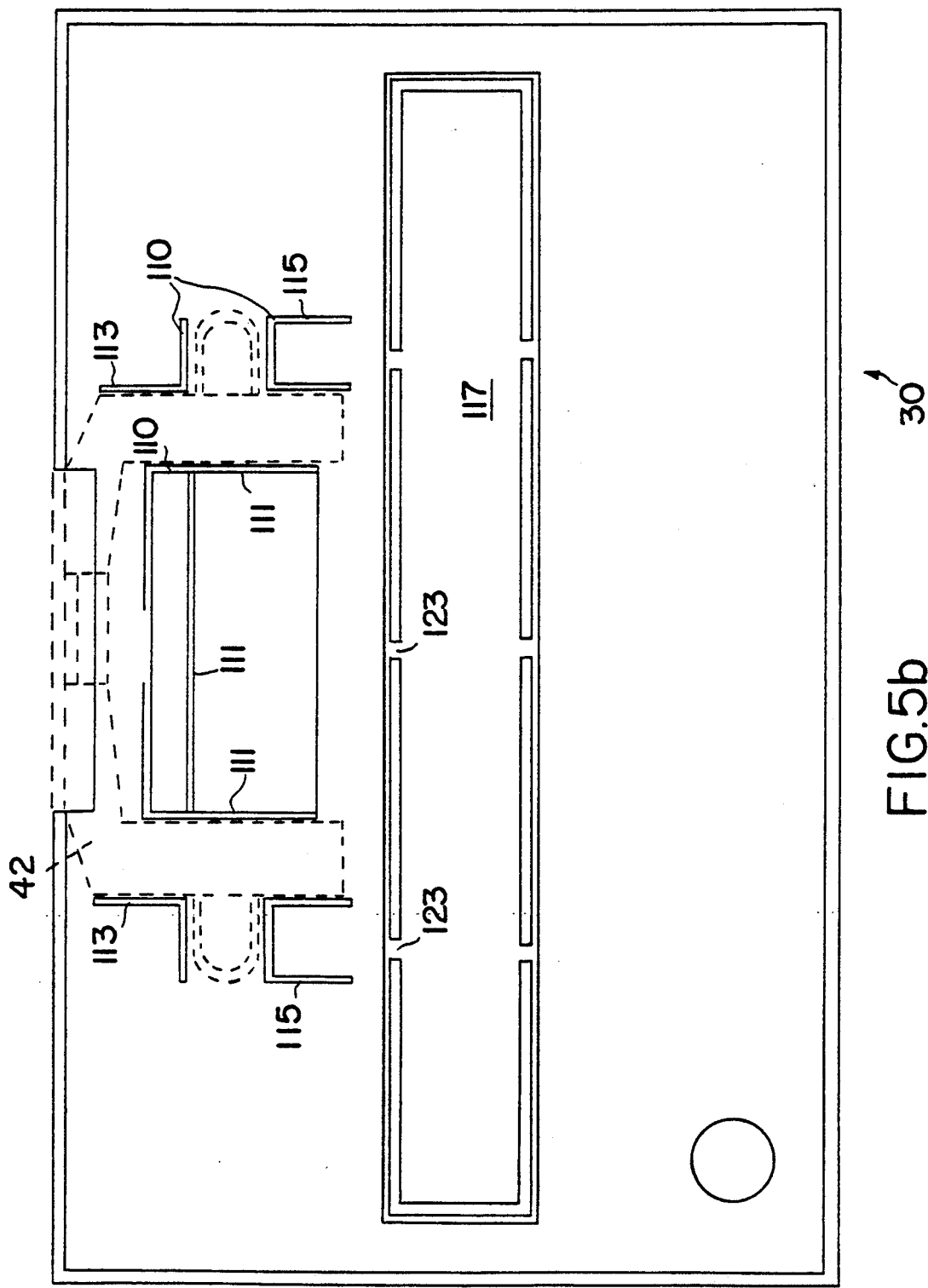

FIG. 5b is a rear view of a front panel of the preferred embodiment showing, in dashed lines, the positioning of the latch assembly within the ledges on the inside of the front panel.

FIG. 6a is a top view of a drawer showing its configuration without sizing inserts in place.

FIG. 6b is a top view of a drawer containing the inserts for re-sizing the drawer to contain one row of 5¼ inch diskettes.

Figure 6C:
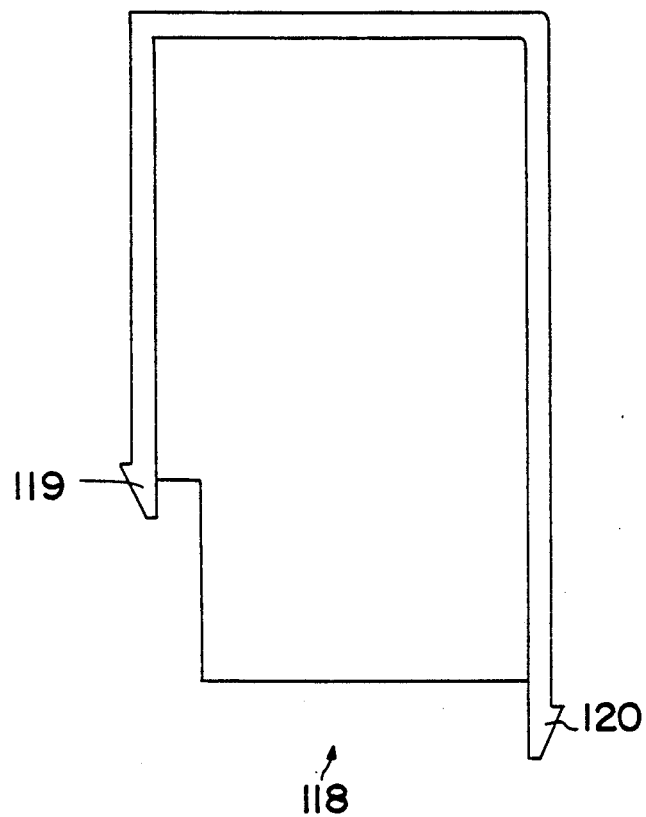

FIG. 6c is a front view of one of the pair of sizing inserts for 5¼ inch diskettes showing its clip configuration for fastening the insert to the side and base of the drawer.

FIG. 6d is a top view of a drawer containing the insert for re-sizing the drawer to contain dual rows of 3½ inch diskettes.

Figure 6E:
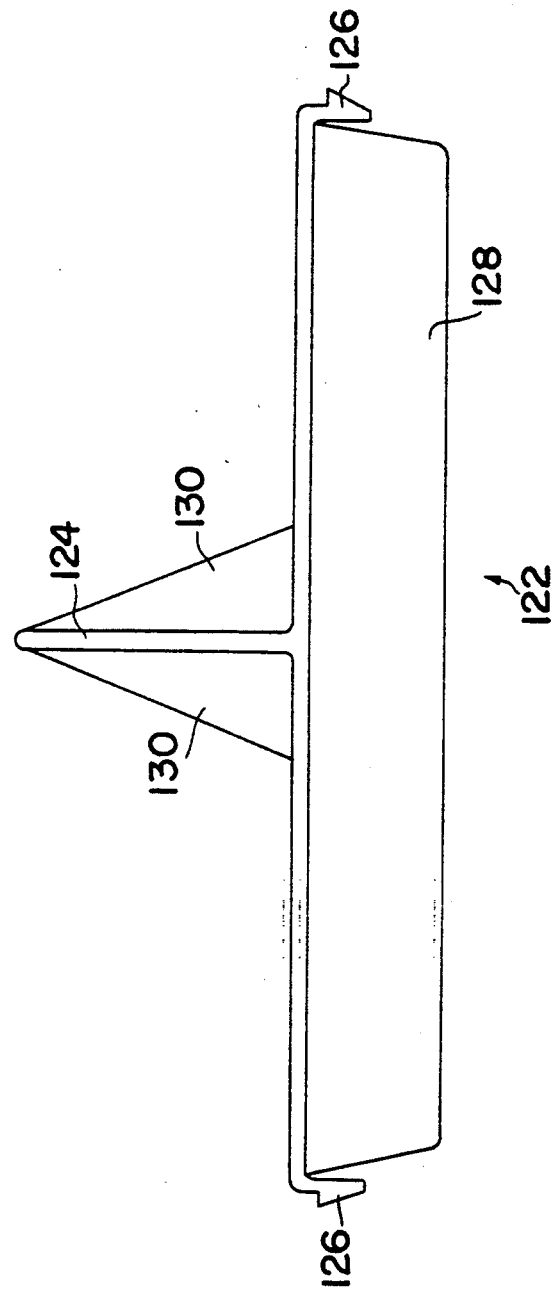

FIG. 6e a front view of the 3½ inch sizing insert showing its fastening means and base filler.

Figure 7A:
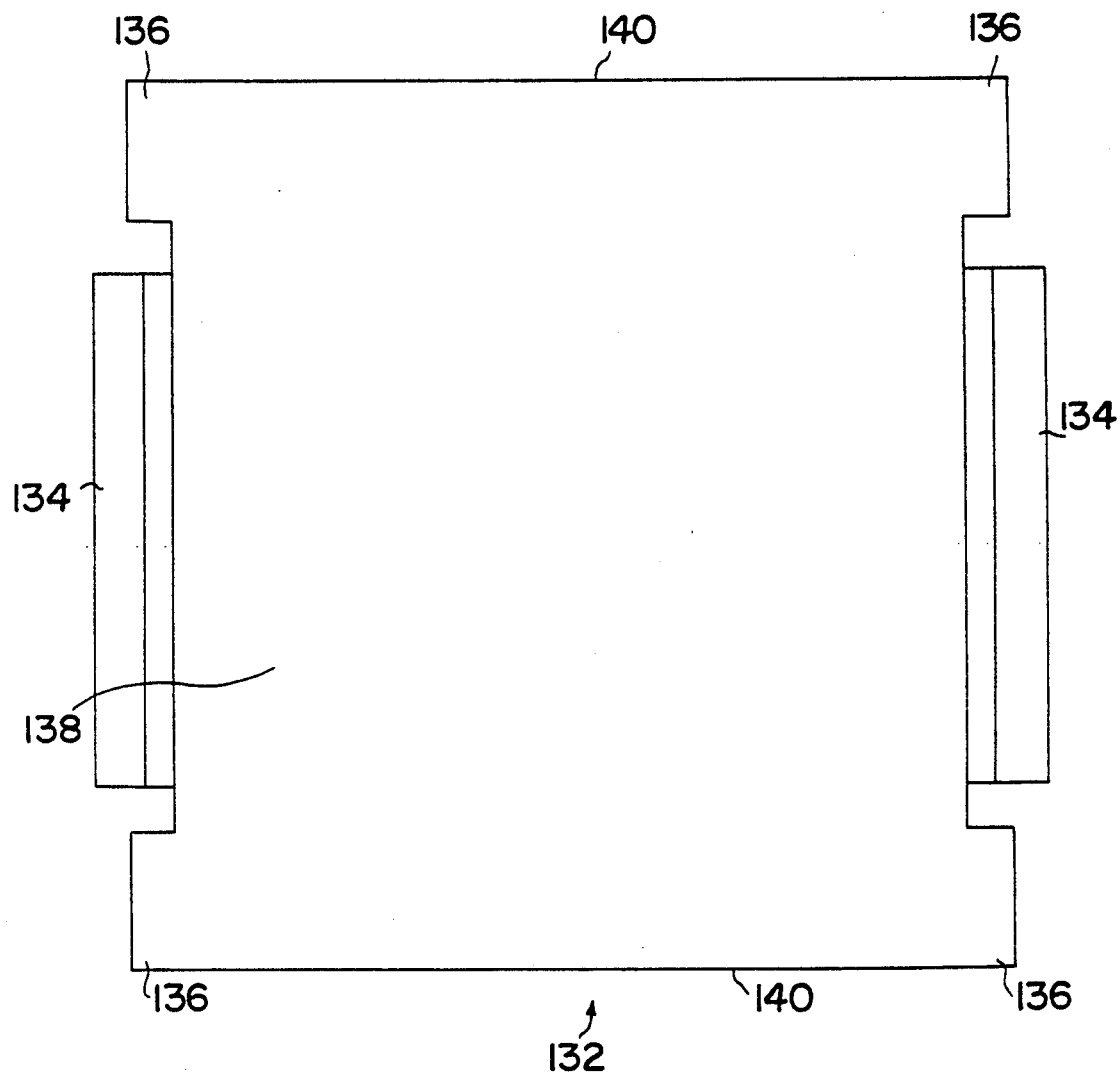

FIG. 7a is a front view of the clip that connects containers that are placed side-by-side or containers that are stacked to further inhibit movement of the containers with respect to each other.

Figure 7B:
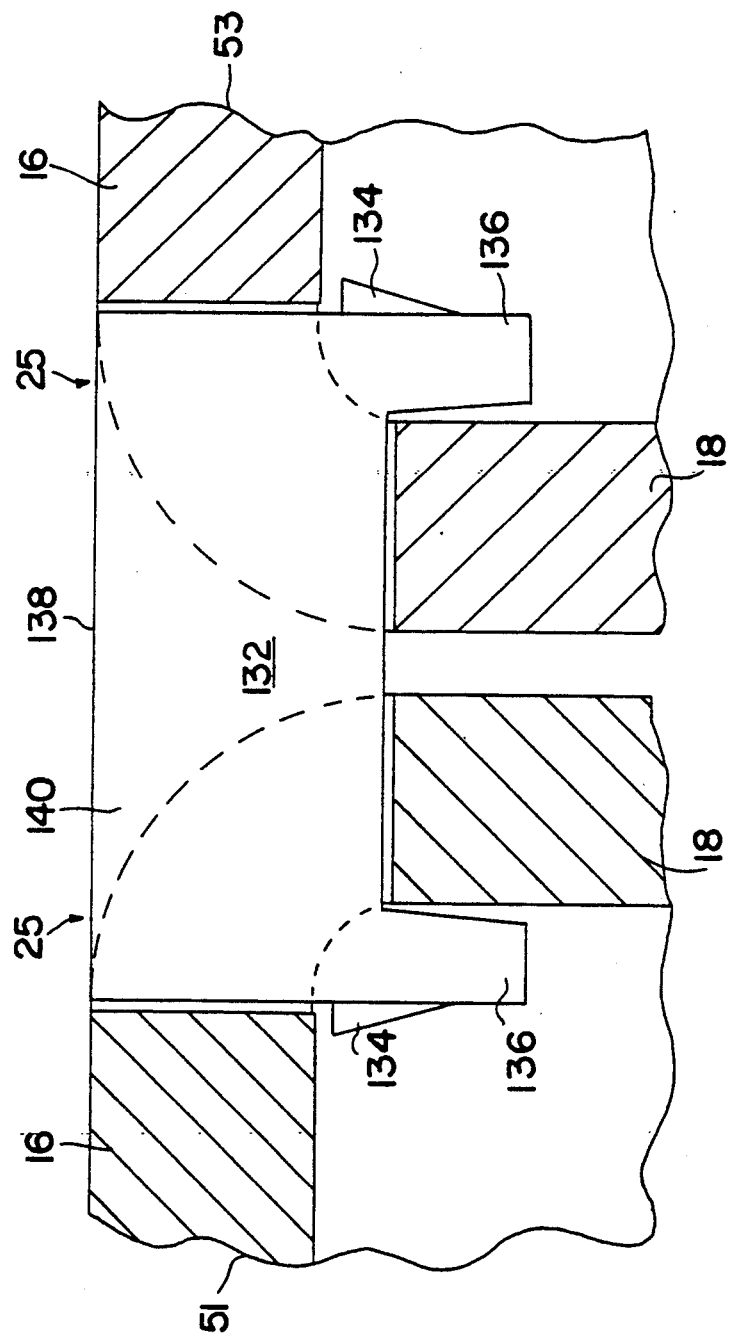

FIG. 7b is a partially broken front view showing the clip connecting two side-by-side units.

DETAILED DESCRIPTION OF THE PREFERRED EMBODIMENT

Figure 1A:
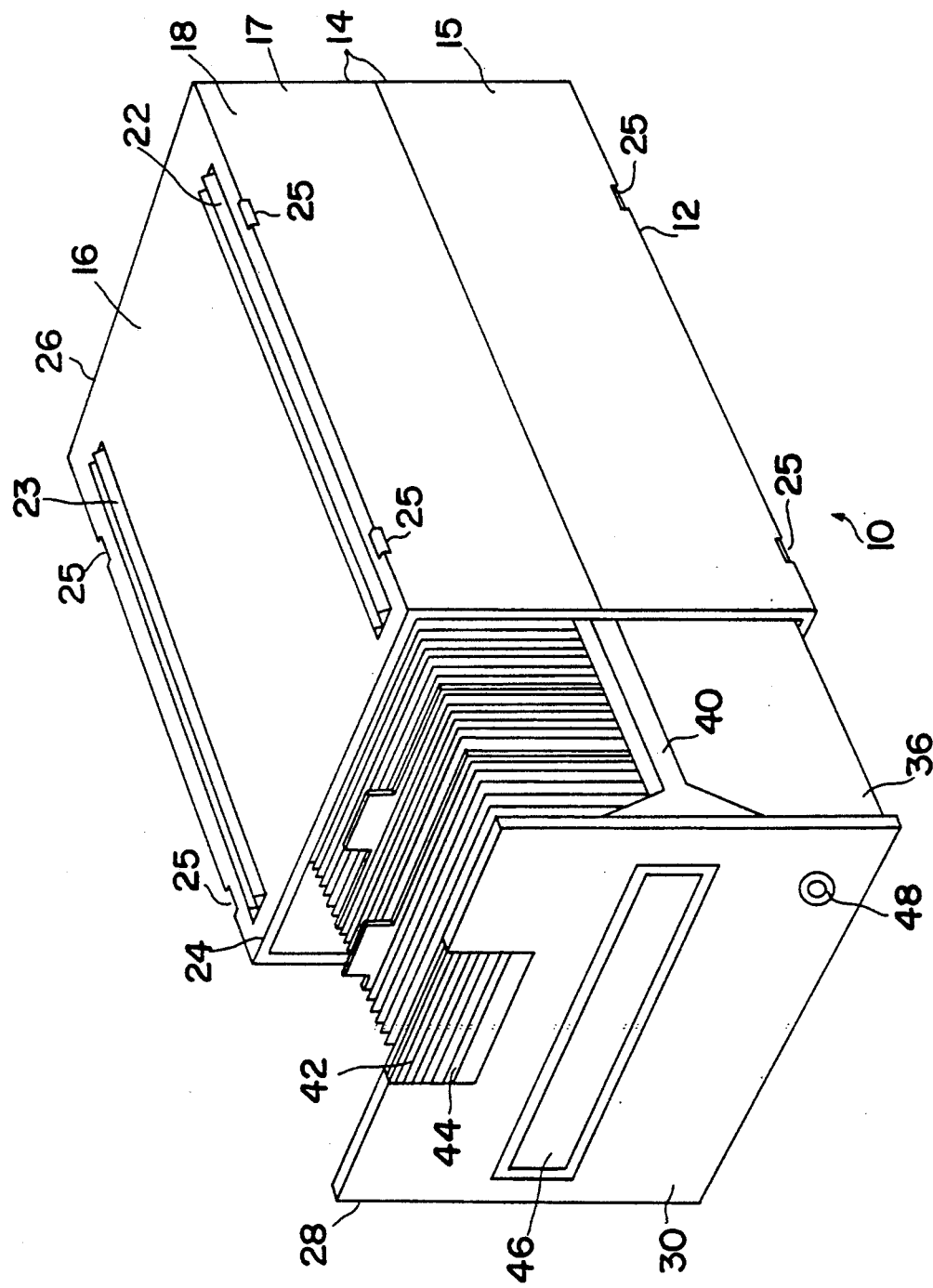
FIG. 1b is a perspective view of a plurality of storage containers of the present invention, stacked and aligned to illustrate their space saving features, some of the containers being shown in an open and partially open configuration and some in a closed configuration.

In FIG. 1a, a modular storage container 10 in accordance with the present invention is shown in a partially open configuration. The housing 12 consists of two identical molded units 14, comprising a lower unit 15 and an upper unit 17. Each of the units 14 has a base 16, two side walls 18 and a rear wall 20. Each molded unit 14 includes two sets of ridges 22 and 23 that project outwardly from the base portion 16, parallel to the side walls 18 of the housing 12. Each set of ridges 22 and 23 is disposed proximate the joinder of a side wall 18 and the base 16, and extends almost the full length of the base 16, stopping just before the front edge 24 and rear edge 26 of the base. Each molded unit 14 also includes four clip holes 25, two disposed at each joinder off a sidewall 18 with the base 16 proximate the front edge 24 and rear edge 26 of the base 16.

The housing 12 receives and contains a drawer 28. Generally, the drawer includes a front panel 30, base 34, two side walls 36, and a rear wall 38. A drawer glide 40 is formed on the upper edge of each side wall 36 to facilitate the sliding of the drawer 28 within the housing 12. At the top center of the front panel 30 is a latch assembly 42 which restrains the drawer in a closed position. The latch assembly 42 is depressed to free the restraint and open the drawer A label window 44, located below the latch 42, can be opened to allow an identification label to be inserted or replaced. A drawer handle 46 is located proximate the center of the front panel; it is recessed and contained within the depth of the front panel. A keyed lock 48 is installed at the lower right hand area of the front panel for security The drawer 28 is discussed in detail hereinafter.

Figure 1B:
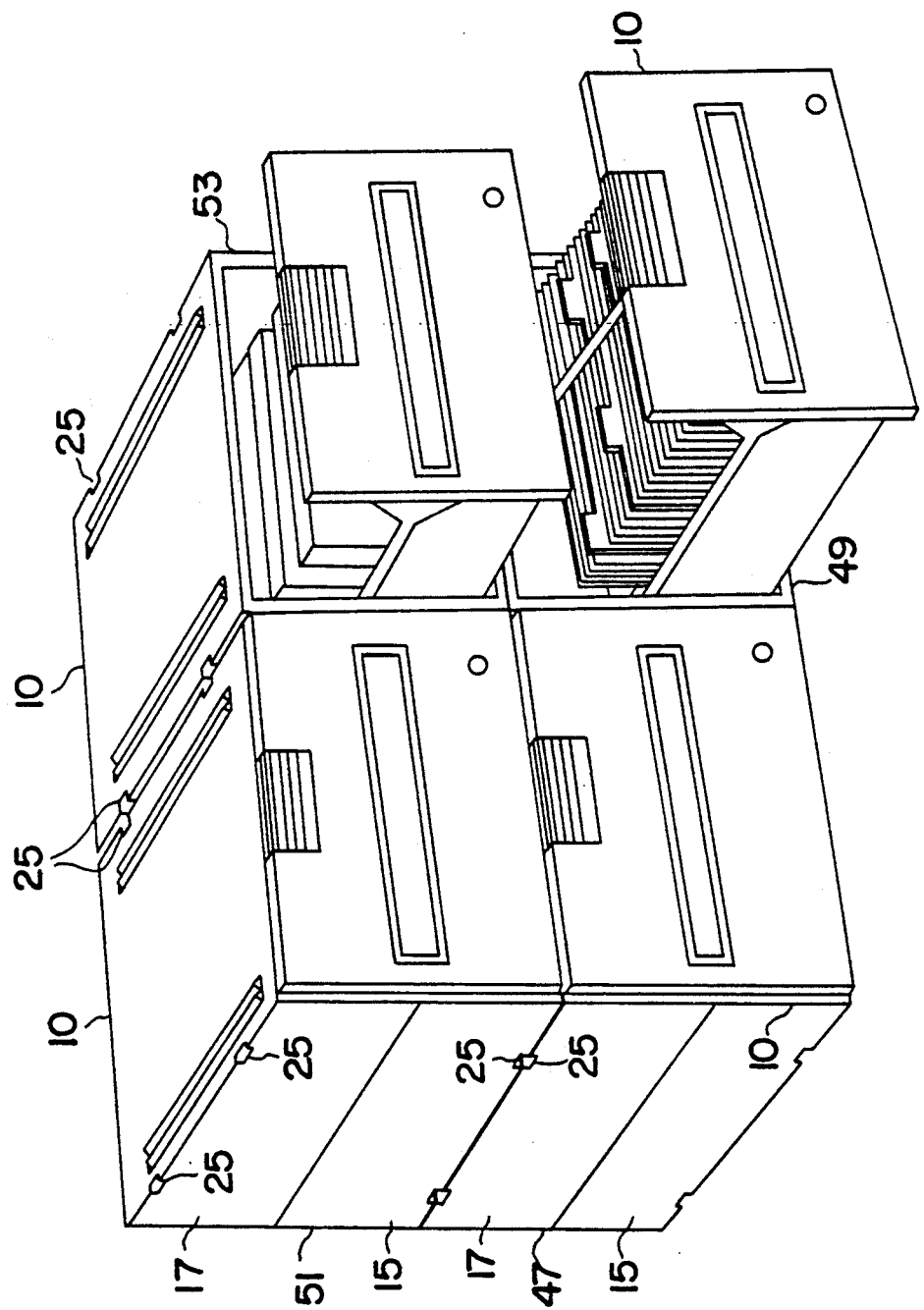

FIG. 1b shows a plurality of the modular storage containers 10 of the preferred embodiment The containers 10 can be placed immediately adjacent to each other, such as containers 47 and 49, because no side clearance is necessary. When the containers are stacked, such as containers 47 and 51, the two sets of ridges on the top of the supporting container 47 interdigitate with the two sets of ridges on the bottom of the mounted container 51 to obtain the correct alignment of the stacked containers and to prohibit independent movement of each container. The containers of FIG. 1b also illustrate three different drawer positions: closed (containers 47 and 51) partially open (container 53), and fully open (container 51).

FIGS. 2a and 2b illustrate the molded unit 14 in two different perspectives, it being understood that the same molded unit 14 serves as both the upper housing unit 15 and lower housing unit 17 when two units 14 are joined together as shown in FIG. 1a. FIG. 2a shows generally the outside of a molded unit 14. In addition to the base 16, side walls 18, and ridges 22 previously described in FIG. 1a, FIGS. 2a and 2b show the connecting tabs 50, skirt 54, reinforcing struts 56, and guide bracket posts 58 of the molded unit's inner construction.

FIG. 2b shows the inner construction of the molded unit more clearly. The long, open edge of the side walls 18 and the rear wall 20 contain tabs 50, alternating with recesses 52, evenly spaced along the length of each side wall and disposed toward the inside of the wall. The thickness of the tabs 52 is approximately one half of the thickness of the wall 18. The skirt 54 of each unit 14 is formed from the outside half of the thickness of the walls 18. The skirt 54 is trimmed to one half the height of the tabs 50 such that the skirts 54 of an upper unit 15 and a lower unit 14 will connect to create a flat outer surface when the two molded units 15 and 17 are joined to form the housing. The tabs 50 extend beyond the height of the skirt 54, while the recesses 52 expose the skirt 54. The rear tabs and recesses are approximately twice the width of the side tabs and recesses. Each side tab 50 contains a hole 60 proximate its center, into which a corresponding restraint will protrude to aid in fastening together the two molded units. The restraint is a portion of a guide bracket which is discussed hereinafter. Note that the rear wall tabs do not contain holes.

Rear wall reinforcing struts 55 are located at the center of each rear wall tab 50 and recess 52, and rise from the base to a height just below the full height of the skirt. Additional reinforcing struts 56 also span the depth of the base from the rear wall reinforcing struts to the front edge of the base 24, as well as along the width of the base from one guide post to the corresponding guide post on the opposite side wall. The sets of ridges 22 and 23 of FIG. 2a have corresponding inward ridges 68 that project from the inner surface of base 16, as shown in FIG. 2b. The guide posts 55 and 58 and ridges 22 and 23 are better illustrated in FIG. 3a.

FIG. 3a is a front view of a typical molded unit 14, wherein a portion of the side wall 18 is shown broken away to better illustrate a guide post 58, bridge 66, tab 50 and skirt 54 assembly. Each guide post 58 is append to a side wall 18 by a bridge 66 spanning from the base 16 to a distance below the outer end of the guide post. A gap 70 is thus created between the outer end of each guide post 58 and the inner surface of the side wall 18. Each tab 50 is formed from the inner half of the side wall 18, and the skirt 54 is formed from the outer half of the side wall 18.

FIG. 3a also depicts a broken away section of the base 16, illustrating the configuration of the sets of ridges 22 and 23. The sets of ridges 22 and 23 are a series of projections 72 and depressions 74 in a generally zigzag pattern normal to the surface of the base. The apex of each projecting ridge 72 is a flattened surface 73. The flattened surface of the ridges 68 directed toward the inner surface of the base 16 is broader than the flattened surface 73 of the projections 72 directed generally perpendicular to the outer surface of the base 16.

The sets of ridges 22 and 23 of the outer surface of each unit are the elements that will align and inhibit movement of the containers when stacked. FIG. 3b illustrates how the ridges 23 of the lower unit 15 of a mounted container 51 interdigitate with the ridges 22 of the upper unit 17 of a supporting container 47 when one container is stacked atop another as depicted in FIG. 1b. The projections 72 of the ridges 23 on the mounted container will fit into the depressions 74 of the ridges 22 on the support container. It is therefore to be realized that the two sets of ridges 22 and 23 are not identically formed That is, as viewed in FIG. 3a, whereas ridges 22 proceed from the side wall 18 with a first depression 74 followed by a projection 72, the ridges 23 proceed from a side wall 18 with first a projection 72 followed by a depression 74. Because the molded units 15 and 17 are identical, this interdigitation aligns one container squarely atop the other.

As indicated hereinabove, and depicted in FIGS. 3a and 3c, the ridges 22 and 23 do not extend entirely across the surface of the base 16 of the unit 14. Thus a portion of the base 16 forms an end wall 78 of each of the depressions 74. The end walls 78 act as a stop at each end of each depression 74 to prevent the longitudinal movement of a projection 72 therewithin, thus inhibiting the longitudinal movement of a mounted container 51 relative to a supporting container 47.

It is therefore to be understood that the containers are secured such that neither container of a stacked pair can move independently of the other in a lateral or longitudinal direction. The sets of ridges 22 and 23 keep each container from moving laterally, and the stops 78 keep each container from sliding longitudinally with respect to each other container.

As depicted in FIGS. 4a and 4b, the joinder of an upper unit 17 with a lower unit 15 is accomplished by utilizing a guide bracket 64. When the two molded units 15 and 17 are joined, the tabs 50 of one unit will mate with the recesses 52 of the opposite unit, and the top edges of both skirts 54 will rest against each other. Although joined, the molded units 15 and 17 are not fastened together at this point. A guide bracket 64 is inserted within each of the side wall joints to fasten the two units together. FIG. 4a is a side view of a guide bracket 64. The guide bracket is formed with a laterally projecting flange 80 which fits into the gap 70 created between the outer end of the guide post 58 and side wall 18 (as seen in FIG. 3a). A plurality of small, outwardly projecting restraints 62 are formed on the back of the flange 80 in alignment with the tab holes 60 of each tab 50. The fastening of the two molded units 15 and 17 together is thus achieved when the restraints 62 on the back side of the flange 80 project into the holes 60 of the tabs 50 of each of the mated molded units.

The guide bracket 64 is integrally formed with an outwardly projecting top shelf 82 and a bottom shelf 84. The top and bottom shelves 82 and 84 of the guide bracket function to position and restrain the drawer 28. Triangular struts 81 are formed between the flange 80 and the top shelf 82 to strengthen the top shelf 82. Similar triangular struts 81 are formed between the flange 80 and the bottom shelf 84 to strengthen it. A drawer stop 86 projects upwardly from the bottom shelf 84 to limit the extent of travel of the drawer 28 in the open position so that the drawer does not easily separate from the housing The drawer 28 can be intentionally removed from the housing by opening the drawer as far as the stop 86 will allow, then lifting the drawer up and over the stop and finally separating drawer from housing.

FIG. 4b shows the guide bracket 64 in position within the housing 12. Prior to joining the two molded units 15 and 17, a guide bracket 64 is set in position on each side wall of a unit by inserting one length of flange 80 into the gap area 70 behind the guide posts 58 of one of the molded units. Next, the other molded unit is mated with the molded unit/guide bracket combination, and the exposed flange 80 of the guide bracket 64 is inserted in to the gap area 70 of the side walls of the second molded unit. Finally the restraints 62 of the guide bracket 64 (shown in FIG. 4a) are fit into the holes 60 of the tabs 50 to securely fasten the two units 15 and 17 and guide bracket 64 together. Each guide bracket 64 spans almost the full length of each side wall of the housing.

FIG. 5a is a perspective view of a drawer 28 of the preferred embodiment. The drawer consists of a base 34, two side walls 36, a rear wall 38, and a face plate 32. Reinforcing struts 56 are formed on the outside of the base. The struts 56 project halfway up the outside of the side walls, and all of the way up the outside of the rear wall. Although not shown, there are similar reinforcing struts formed half way up the inside of the face plate 32 also.

The drawer base 34 contains a plurality of slots 88 evenly spaced in two rows along a longitudinal axis. The function of the slots 88 is to receive the tabs of a drawer divider in order to hold the divider in place as is well known. The slots are greater in length than in width and they are positioned in the base with their length normal to the longitudinal axis of the base. Each side wall 36 is formed with a narrow insert support ledge 116 which protrudes into the drawer cavity.

A plurality of rectangular holes 92 are formed through the drawer ledge 116 proximate the side walls 36. These holes 92 are receptacles for the fastening means of the inserts to be discussed hereinafter.

As mentioned hereinabove, a drawer glide 40 is formed in each side wall 36 of the drawer to position the drawer within the housing by its interface with the guide bracket 64. Each drawer guide 40 is formed as a squared lip that extends outwardly from the open upper edge of each drawer side wall 36, and then downwardly, 45 degrees from the open edge of the outward extension. The underside of the drawer guide 40 is hollow, and the drawer guide 40 is supported with a plurality of reinforcing struts and a stop plate 94. A portion of the drawer guide 40 in FIG. 5a is broken away to show the stop plate 94. The stop plate 94 functions with the stop 86 of the guide bracket 64 to halt the outward motion of the drawer. Aft of the stop plate 94, the width of the downward portion of the drawer guide 40 begins to narrow, and it continues narrowing until the end of the drawer guide. The front end 97 of the drawer guide 40 is attached to the face plate 32 of the drawer, and reinforced by braces 96 disposed on each side of the drawer guide. The braces 96 are triangular structural members which are joined to the drawer guide 40 and the face plate 32, with their greatest length attached to the face plate 32. The braces 96 function to add support to the drawer guide 40.

The face plate 32 acts as a backing plate for the front panel 30. Together the front panel 30 and face plate 32 house the latch assembly 42 and parts of the handle 46 and keyed lock 48.

The latch assembly 42, as shown in FIG. 5a, is generally U-shaped, with the straight portions of the "U" being a pair of legs 98, each having a projecting ear-like member 100. Each leg 98 has a pair of reinforcing ridges 102 on its front side only, disposed along the outer edges of the leg. The ears 100 are thin semicircular rod-like pieces having a square cross-section, that are attached at one end thereof to the outside of each leg 98 at approximately the midpoint of the leg. The other end of each ear 100 is unattached, leaving a gap between the unattached end and the leg 98. The curved structure of the ears 100 provides a spring return force to the latch assembly 42 as is discussed hereinafter.

The latch assembly 42 has a base portion 104 that is disposed between each leg 98 and joins the legs 98 together A hook member 106 and cap member 108 are attached to the base 104 proximate the center of the base 104. The cap 108 is attached to the side of the base 104 that faces forward, and the hook 106 is attached to the side of the base 104 that faces rearward.

As illustrated in FIG. 5b, on the inside of the front panel 30, there is a system of protruding ledges 110 into which the latch assembly 42 fits. The backside of the window 44 is outlined in ledges 111. An "L" shaped ledge 113 and a square inverted "U" shaped ledge 115 are also formed on the panel 30. When assembled, the ears 100 of the latch assembly 42 are set between the "L" shaped ledges 113 and the "U" shaped ledges 115, and the legs 98 are placed between the window ledges 111 and the "L" and "U" shaped ledges 113 and 115 respectively. The dashed lines in FIG. 5b illustrate the positioning of the latch assembly 42 within the front panel's structure of ledges.

The latch assembly 42 functions to maintain the drawer 28 in a closed position. The hook 106 will catch on the front lip 24 of the housing unit to prohibit the opening of the drawer. To open the drawer, the operator will push down on the cap 108 of the latch assembly 42. When the cap 108 is pushed down, the ears 100 will compress, allowing the latch assembly 42 to be moved downwardly just enough for the hook 106 to clear the lip 24 of the housing. The operator then pulls the drawer 28 forward to open it. The curved ears 100 function within the ledges 113 and 115 to provide an upward spring force to return the latch assembly 42 to its upward position upon release of the downward force.

As shown in FIGS. 5a and 5b, the front panel 30 has a rectangular cut out 117, proximate its center, of sufficient size to contain a handle 46, and a circular cut out 119 at its lower right corner where a lock 48 will pass through. At the top center of the front panel is a rectangular area 112 where the label will be located, sandwiched between this backing 112 and a transparent front covering that is the label window 44. The handle 46 is inserted into the assembled front panel 30 and face plate 32, and is fastened in place by its tangs 121 which are fitted into slits 123 formed in the front panel/face plate opening. The handle of the preferred embodiment is angled upwardly to accommodate one-handed opening by the operator To open, the operator places his thumb on the cap 108 and his other four fingers (pointing upwards) into the handle 46, so that, by using a squeezing motion, he can push the cap down to unlatch the drawer, and then pull the drawer open.

A standard keyed lock 48 fits into the circular opening 119 of the front panel/face plate assembly. The lock 48 has a stop arm 114 that is shown in a "locked" position in FIG. 6a. The arm 114 extends through an opening 115 formed in the side of the drawer 28 beyond the exterior perimeter of the drawer 28, so that when the drawer is pulled to open, the stop arm 114 will catch on the housing side lip and prohibit the opening of the drawer.

Inserts can be placed inside the drawer 28 to change the drawer's inner dimensions to accommodate different sizes of cassettes, diskettes, or other objects. FIG. 6a is a top view of a drawer of the preferred embodiment without any inserts. The drawer ledge 116 is formed at approximately one-third of the height of each side wall 36. Each drawer ledge 116 contains three rectangular holes which function to receive mounting clips of the inserts. Each side of the drawer base 34 also contains three rectangular holes 93 having the same function as the ledge holes 92.

FIG. 6b illustrates the drawer of FIG. 6a with the two inserts 118 for 5¼ inch diskettes in place. FIG. 6c is a side view of a 5¼ inch insert showing the two rows of mounting clips 119 and 120 which hold the insert in place. The clips 119 are inserted into the rectangular holes 92 of the drawer ledge 116, and the clips 120 are inserted into the rectangular holes 93 in the base 34 of the drawer. The function of the clips 119 and 120 is to fasten the insert 118 to the base 34 and side walls 36 of the drawer. As shown in FIG. 6b, the two inserts 118 reduce the width of the drawer to accommodate a single row of 5¼ inch diskettes by filling the extra side space of the drawer. Also shown in FIG. 6b is the keyed lock 48 in a "unlocked" position.

A different insert is used for accommodating 3½ inch diskettes. FIG. 6d is another top view of a drawer 28, this time illustrating the 3½ inch insert 122. The insert 122 utilizes the full width of the drawer and includes a middle divider 124. Thus, two rows of 3½ inch diskettes can be contained in one drawer. FIG. 6e is a side view of the insert 122, showing that the insert is fastened by its clips 126 to the side wall ledge holes 92 only. The mini diskette insert 122 reduces the height of the drawer by filling the extra base space of the drawer with a lift 128. The middle divider 124 of the insert 122 is reinforced by triangular supports 130 disposed on each side of the divider at the rear of the insert.

FIG. 7a shows a clip 132 which is used in the present invention to connect containers that are placed in a side-by-side or stacked relationship so that the containers are prohibited from moving laterally or vertically apart from each other, or longitudinally out of alignment with each other. A side view of the clip 132 is presented in FIG. 7b. The clip 132 includes a rectangular base portion 138 having two sides 140 and four legs 136 that are joined to the base 138, one of which legs 136 projects outwardly from each corner of the rectangular base 138. Two clip hooks 132 are joined to the edge of the body 138, one hook 132 being disposed between two legs 136 on one side of the base 138 and the other hook 132 being disposed on the oppposite side of the base 138 between two opposite legs 136. A portion of each clip hook 132 projects outwardly of the legs 136, as viewed in FIG. 7b. The clip 132 is utilized by placing the clip 132 into a clip hole 25 of the housing 12 in such a way that the clip hook 134 and the clip legs 136 rest against adjacent sides of the housing. This positioning is illustrated in FIG. 7b.

FIG. 7b is a partial front view of containers 51 and 53 of FIG. 1b. The side walls 18 and bases 16 are broken away at corresponding holes 25 to illustrate how the clip 132 is positioned within the two clip holes 25 to connect the two containers 51 and 53. To connect the two containers 51 and 53, the clip 132 is placed in the clip holes 25 such that the base 138 of the clip bridges the bases 16 of the containers. The clip legs 136 project into the holes 25 to straddle side wall 18 of container 51 and side wall 18 of container 53 to prohibit lateral movement of the containers. The clip hooks 134 project laterally within each hole 25 to catch on the inner face of the base 16 of each container 51 and 53, thereby inhibiting any significant vertical movement of the containers relative to each other. The width of the clip 132 is slightly less than the width of the clip hole 25. When the clip 132 is in position, longitudinal movement of containers in opposite directions will be limited because the sides 140 of the clip 132 are constrained by the size of the clip hole 25 opening, and lateral movement of the containers relative to each other is inhibited by the legs 136 that straddle and restrain movement of the side walls 18 of the containers.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A storage container comprising:
   two molded units which are joined to form a housing, each of said molded units including a base, two side walls and a rear wall, each of said walls having an edge that is attached to said base and an open edge opposing said attached edge;
   said open edges of said walls of each said molded unit being formed such that two of said molded units may be joined together at a mating joinder of said open edges;
   portions of said open edges of said walls including a plurality of tabs that extend upwardly beyond said open edge, and portions of said open edges including a plurality of recesses that extend into portions of said open edges; said tabs and said recesses being disposed in an alternating relationship along said open edges; whereby said tabs and recesses of one of said two molded units will interdigitate with said tabs and recesses of another of said molded units when said two molded units are joined together, in order to align and secure said molded units together to form said housing;
   fastening means for securing the joinder of said open edges of said two molded units of said housing; said fastening means including a guide bracket; said guide bracket having a clamping means that functions to hold portions of said tabs thereto;
   each of said tabs on said side walls including a hole being formed therethrough proximate its center, and said clamping means including a plurality of restraints, said restraints being disposed to protrude into said holes of said tabs; and
   a drawer being sized to fit inside said housing.

2. A storage container as recited in claim 1 wherein said guide bracket includes a drawer guide means that functions to engage portions of said drawer to guide said drawer in a sliding relationship within said housing.

3. A storage container as recited in claim 2 wherein said base of said molded unit has an outer surface; at least one set of ridges being formed to project from said outer surface;
   said set of ridges of said units being disposed upon said outer surface such that one said set of ridges will interdigitate with another said set of ridges disposed upon the outer surface of another of said units when two of said units are disposed in a stacked relationship, in order to align and inhibit movement of said two stacked units.

4. A storage container comprising:
   two molded units which are joined to form a housing, each of said molded units including a base, two side walls and a rear wall, each of said walls having an edge that is attached to said base and an open edge opposing said attached edge;
   said open edges of said walls of each said molded unit being formed such that two of said molded units may be joined together at a mating joinder of said open edges;
   fastening means for securing the joinder of said open edges of said two molded units of said housing;
   a drawer being sized to fit inside said housing;
   said base of each said molded unit having an outer surface;

two sets of ridges being formed to project from said outer surface; said sets of ridges of said units being substantially identical and being disposed upon said outer surface such that one said set of ridges will interdigitate with another said set of ridges disposed upon the outer surface of another of said units when two of said units are disposed in a stacked relationship, in order to align and inhibit movement of said two stacked units.

5. A storage container as described in claim 4 wherein said two sets of ridges are equally spaced relative to a center line of said outer surface of said base.

6. A storage container as recited in claim 4 wherein each of said sets of ridges includes at least one outwardly projecting element relative to said outer surface, and at least one inwardly projecting groove relative to said outer surface; said two sets of ridges being disposed relative to a center line of said outer surface such that one said set is formed with an outwardly projecting member disposed in closest proximity to said center line, and said other set is formed with an inwardly projecting groove disposed in closest proximity to said center line.

7. A storage container as recited in claim 4 wherein portions of said open edges of said walls include a plurality of tabs that extend upwardly beyond said open edge, and portions of said open edges including a plurality of recesses that extend into portions of said open edges; said tabs and said recesses being disposed in an alternating relationship along said open edges; whereby said tabs and recesses of one of said two molded units will interdigitate with said tabs and recesses of another of said molded units when said two molded units are joined together, in order to align and secure said molded units together to form said housing.

8. A storage container as recited in claim 7 wherein said fastening means include a guide bracket; said guide bracket having a clamping means that functions to hold portions of said tabs thereto.

9. A storage container as recited in claim 8 wherein each of said tabs on said side walls includes a hole being formed therethrough proximate its center, and said clamping means includes a plurality of restraints, said restraints being disposed to protrude into said holes of said tabs.

10. A storage container as recited in claim 8 wherein said guide bracket includes a drawer guide means that functions to engage portions of said drawer to guide said drawer in a sliding relationship within said housing.

* * * * *